Aug. 1, 1939.   L. E. LA BRIE   2,167,721
BRAKE
Original Filed Nov. 22, 1930

INVENTOR
LUDGER E. LaBRIE
BY Jerome R. Cox
ATTORNEY.

Patented Aug. 1, 1939

2,167,721

UNITED STATES PATENT OFFICE 2,167,721

BRAKE

Ludger E. La Brie, Detroit, Mich., assignor to Bendix Brake Company, South Bend, Ind., a corporation of Illinois Original application November 22, 1930, Serial No. 497,383, now Patent No. 2,095,752, dated October 12, 1937. Divided and this application July 27, 1936, Serial No. 92,798

2 Claims. (Cl. 60—54.6)

This invention relates to brakes, and is illustrated as embodied in a novel system of hydraulic brakes for an automobile.

It will be appreciated that the presence of any substantial amount of air in the lines of a hydraulic brake system renders the system almost inoperative, as all of the brake-applying movement of the parts is then taken up idly in compressing the air. The great advantages of a hydraulic brake system depend to a great extent on the non-compressibility of the operating liquid.

One object of the invention is to provide means to eliminate air from the system and to prevent its re-entry.

Features of the invention relate to the construction of the wheel cylinders, several forms being shown. These features have to do with sealing the parts against leakage, to an arrangement for "bleeding" the lines, i. e. filling them with liquid and getting rid of entrapped air, and to an arrangement of a two-way check valve in itself embodying substantial novelty, to facilitate the "bleeding".

The above and other objects and features of the invention, including various novel and desirable details of construction, will be apparent from the following description of the illustrative embodiments shown in the accompanying drawing, in which.

Figure 1:
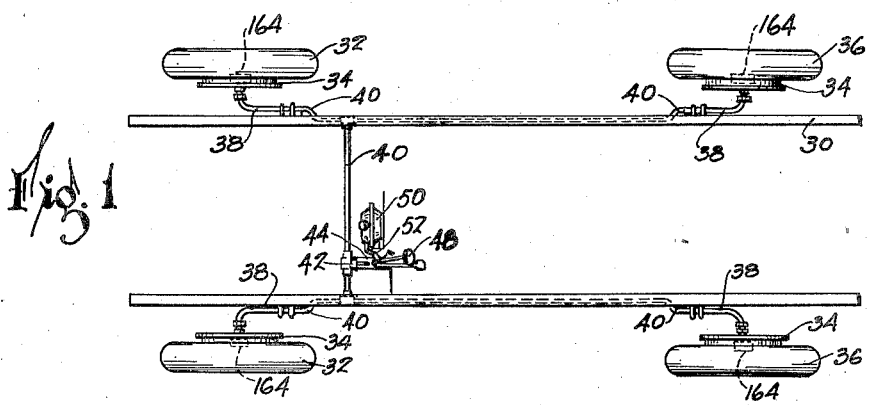
Figure 1 is a top plan view of part of an automobile chassis showing the arrangement of the parts of a system of hydraulic brakes.
Figure 2:
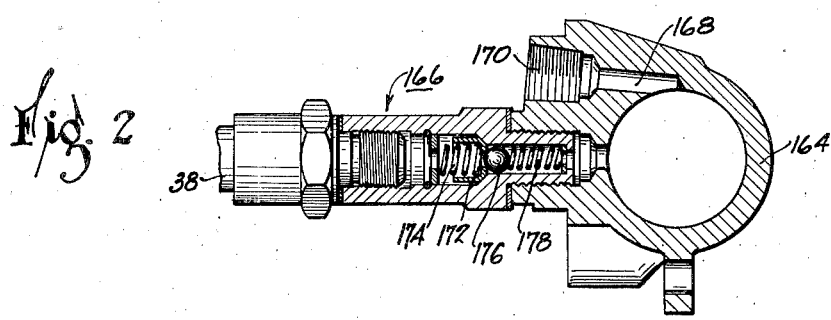
Figure 2 is a section through the cylinder at the brake showing the connection thereto of the hose coupling or the like from the operating lines, and illustrating particularly the arrangement of a two-way check valve used in bleeding the line.

The chassis shown in Figures 1 and 2 includes the usual chassis frame 30 supported by the usual springs on front and rear axles (not shown) carried by front wheels 32 having brakes indicated generally at 34 and on rear wheels 36 having brakes also indicated generally at 34.

The brakes are intended to be operated by a hydraulic system including flexible hose connections 38 adjacent the four wheels and communicating by suitable pipes 40 carried by the chassis frame 30 with the outlet 42 of a master cylinder assembly 44 which may be of one of any suitable forms and which may include an operating piston connected by a piston rod 46 with the usual brake pedal 48. The hydraulic system is kept full of liquid by means of a reservoir 50 which is mounted on the dash above the master cylinder and on the opposite side of the dash from the driver. The reservoir 50 is connected to the master cylinder 44 by means such as a flexible conduit 52.

A connection between the master cylinder and each of the wheel cylinders 164 preferably includes, immediately adjacent the wheel cylinder, a fitting 166 within which is arranged a two-way check valve which is utilized to control "bleeding" through a passage 168 which is normally closed by a plug threaded into an outlet opening 170. In the arrangement of Figure 2, fitting 166 is formed internally with a double diameter bore. Inside of the larger diameter portion of the bore is a cup-shaped piston valve 172 urged by a spring 174 against a conical seat at the junction of the small and large diameter parts of the bore. The valve member 172 is formed with an opening base communicating with the small diameter part of the bore and which is normally closed by a ball check valve 176 urged thereagainst by a spring 178. When it is desired to "bleed" the system to fill it with liquid or to remove air which has become entrapped therein, the plug is removed from the outlet opening 170 and sufficient liquid is forced from the master cylinder and the reservoir through the various conduits 38 and 40 to fill all the wheel cylinders 164 and pump an excess through the four outlets 170 sufficient to insure the removal of all the air. When this is being done, the ball check valve 176 yields to permit the passage of the additional liquid. During the application of the brake, when pressure is applied to the system, liquid passes the ball check valve 176 through opening in the base of the cup-shaped valve member 172 in sufficient quantity to force the brake shoes against the drum. When the brake is released, the return springs force this additional liquid backwardly, whereupon the cup-shaped valve member 172 moves back off its conical seat and permits the additional liquid to leak back around between the valve member and the large diameter part of the bore of the fitting 166.

Figures 3, 4:
Figures 3 and 4 are sections through fittings containing different types of two-way check valves which may be substituted for the one shown in Figure 2.

In Figures 3 and 4 are shown two other forms of two-way check valves which may be provided in the fitting 166. In the arrangement of Figure 3, the cup-shaped valve member 172 is arranged as in Figure 2, but in place of the ball check valve 176 I provide another piston valve member 188 held between spring 178 in a position to close the opening in the bottom of the valve member 172. In the arrangement of Figure 4, a hollow valve member 182 is held against the above-described conical seat between spring 174, a ball check valve 184 being arranged inside of the valve member 182 and held in place lightly by a spring 186.

While a number of illustrative embodiments of the invention have been described in detail, it is not my intention to limit its scope to these particular embodiments or otherwise than by the terms of the appended claims.

The present application is a division of my application Serial No. 497,383, filed November 22, 1930, issued as Patent No. 2,095,752 on October 12, 1937.

I claim:

1. A wheel cylinder having a bleeder outlet and having a connection to brake system conduit, in combination with a means arranged in said connection between the conduit and the cylinder for allowing substantially free passage of liquid from said conduit to the cylinder and allowing passage of fluid under substantial differentials in pressure from the cylinder to the conduit for maintaining a predetermined pressure upon the liquid in the cylinder.

2. A wheel cylinder having a bleeder outlet and having an inlet connection, a brake system conduit connected to said inlet, in combination with a conduit fitting for connecting said wheel cylinder to said conduit formed with a pair of concentric communicating bores of different diameters, the smaller bore being connected directly to the cylinder and the larger bore being connected directly to the conduit and formed with a shoulder between the two bores, and said fitting being provided with a cage normally urged by a relatively heavy spring toward the shoulder and provided with a ball normally urged by a relatively light spring to seat upon said cage to prevent passage of fluid from the cylinder into the conduit except under a substantial pressure differential.

LUDGER E. LA BRIE.